United States Patent
Kokinelis et al.

(10) Patent No.: US 9,654,050 B2
(45) Date of Patent: May 16, 2017

(54) FORWARD/REVERSE SWITCHING DEVICE FOR POWER TOOLS

(75) Inventors: Christopher Anthony Kokinelis, Flemington, NJ (US); Randolph Robert Ruetsch, Branchburg, NJ (US); Daniel Jay Becker, Monroe Township, NJ (US)

(73) Assignee: Ingersoll-Rand Company, Davidson, NC (US)

( * ) Notice: Subject to any disclaimer, the term of this patent is extended or adjusted under 35 U.S.C. 154(b) by 899 days.

(21) Appl. No.: 14/005,677

(22) PCT Filed: Mar. 31, 2011

(86) PCT No.: PCT/US2011/030644
§ 371 (c)(1),
(2), (4) Date: Sep. 26, 2013

(87) PCT Pub. No.: WO2012/134471
PCT Pub. Date: Oct. 4, 2012

(65) Prior Publication Data
US 2014/0015383 A1    Jan. 16, 2014

(51) Int. Cl.
*H02P 31/00* (2006.01)
*B25F 5/02* (2006.01)
*H01H 9/06* (2006.01)

(52) U.S. Cl.
CPC ............. *H02P 31/00* (2013.01); *B25F 5/02* (2013.01); *H01H 9/063* (2013.01)

(58) Field of Classification Search
CPC ........................................................ B25F 5/02
See application file for complete search history.

(56) References Cited

U.S. PATENT DOCUMENTS

| | | |
|---|---|---|
| 4,342,931 A | 8/1982 | Grossmann et al. |
| 4,588,910 A | 5/1986 | Bausch |
| (Continued) | | |

FOREIGN PATENT DOCUMENTS

| | | |
|---|---|---|
| CN | 101829982 A | 9/2010 |
| CN | 201586966 U | 9/2010 |
| (Continued) | | |

OTHER PUBLICATIONS

Office Action dated Sep. 2, 2015 from Chinese Patent Application No. 201180069727.X filed Mar. 31, 2011.
(Continued)

*Primary Examiner* — Shawki S Ismail
*Assistant Examiner* — Muhammad S Islam
(74) *Attorney, Agent, or Firm* — Sunstone IP (57) ABSTRACT

A power tool includes a housing, an electric motor mounted in the housing, and a switching device for reversing rotation direction of the motor. The switching device includes an actuator slidably secured to the housing and movable between first and second positions. The actuator includes a magnet. A first ferromagnetic member is attached to a first housing section so as to be within range of attraction force of the magnet when the actuator is in the first position and a second ferromagnetic member is attached to a second housing section so as to be within range of attraction force of the magnet when the actuator is in the second position. A hall sensor is attached to the housing so as to be proximate the magnet as the actuator is moved between first and second positions. Proximity of the magnet and hall sensor reverses the direction of rotation of the motor.

20 Claims, 9 Drawing Sheets

(56) References Cited

U.S. PATENT DOCUMENTS

| | | | |
|---|---|---|---|
| 5,089,729 A | | 2/1992 | Moores, Jr. |
| 5,136,220 A | * | 8/1992 | Philipp .................... H02P 6/24 |
| | | | 318/362 |
| 5,268,622 A | * | 12/1993 | Philipp .............. A61B 17/1626 |
| | | | 318/400.08 |
| 5,747,953 A | * | 5/1998 | Philipp .............. A61B 17/1626 |
| | | | 318/114 |
| 6,960,894 B2 | * | 11/2005 | Carusillo ........... A61B 17/1626 |
| | | | 318/400.01 |
| 7,414,211 B2 | | 8/2008 | Elsworthy |
| 8,786,233 B2 | * | 7/2014 | Fair ...................... B25B 13/461 |
| | | | 318/400.38 |
| 2006/0213333 A1 | | 9/2006 | Kageler et al. |
| 2007/0108035 A1 | | 5/2007 | Broghammer |
| 2013/0192860 A1 | * | 8/2013 | Puzio ....................... B25F 5/00 |
| | | | 173/47 |

FOREIGN PATENT DOCUMENTS

| | | |
|---|---|---|
| CN | 201664773 U | 12/2010 |
| CN | 101970183 A | 2/2011 |
| EP | 0423673 A1 | 4/1991 |
| EP | 1 080 849 B1 | 3/2001 |
| EP | 1369206 A1 | 12/2003 |
| EP | 1 472 708 B1 | 11/2004 |
| EP | 1765557 | 3/2007 |
| EP | 1895555 A2 | 3/2008 |
| EP | 2008776 A1 | 12/2008 |
| KR | 20-0288093 | 9/2002 |

OTHER PUBLICATIONS

Office Action dated Feb. 6, 2016 from Chinese Patent Application No. 201180069727.X filed Mar. 31, 2011.
International Search Report dated Dec. 29, 2011 from International Patent Application No. PCT/US2011/030644 filed Mar. 31, 2011.
Office Action dated Jan. 12, 2015 from Chinese Patent Application No. 201180069727.X filed Mar. 31, 2011.
European Search Report dated Jul. 29, 2015 from European Patent Application No. 118624703.3 filed Mar. 31, 2011.
Notification concerning Transmittal of International Preliminary Report on Patentability; Date of Mailing: Oct. 10, 2013; International Report on Patentability; Written Opinion of the International Searching Authority corresponding to International Application No. PCT/US2011/030644; 6 pages.

* cited by examiner

FORWARD/REVERSE SWITCHING DEVICE FOR POWER TOOLS

RELATED APPLICATION

This application is a 35 U.S.C. §371 national stage application of PCT Application No. PCT/US2011/030644, filed on Mar. 31, 2011, the disclosure of which is incorporated herein by reference as if set forth in its entirety. The above-referenced PCT International Application was published in the English language as International Publication No. WO 2012/134471 on Oct. 4, 2012.

FIELD OF THE INVENTION

This invention relates to power tools and is particularly suitable for cordless power tools.

BACKGROUND

In portable electric tools, such as drills, nutrunners, and screwdrivers, for example, it is desirable to reverse the direction of rotation of the motor to facilitate, for example, the loosening and removal of screws, for rotating a thread-cutting tool out of a bore after cutting a thread therein, etc. This is accomplished by reversing the polarity across the armature of the motor thereby changing the direction in which the current flows therethrough. Actuators utilized to reverse polarity need to lock into position and activate a switch prior to a user depressing a trigger that energizes the tool.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a power tool includes a housing having first and second sections releasably engaged. An electric motor is mounted in the housing, and a switching device is provided for reversing direction of current through the motor to reverse direction of rotation of the motor. The switching device includes an actuator that is slidably secured to the housing and configured to be movable by a user between first and second positions. A magnet is attached to the actuator via a holder positioned between opposite end portions of the actuator. A first ferromagnetic member is attached to the first housing section so as to be within range of attraction force of the magnet when the actuator is in the first position and a second ferromagnetic member is attached to the second housing section so as to be within range of attraction force of the magnet when the actuator is in the second position. The actuator is releasably maintained in the first position by magnetic attraction of the magnet and first ferromagnetic member, and the actuator is releasably maintained in the second position by magnetic attraction of the magnet and second ferromagnetic member. A hall sensor is located within the housing so as to be proximate the magnet as the actuator is moved between the first and second positions. Proximity of the magnet and hall sensor causes the direction of rotation of the motor to reverse.

In some embodiments, the magnet has a cylindrical configuration and the holder comprises a corresponding cavity with a cylindrical configuration that receives the magnet therein. In some embodiments, the holder has open end portions such that the magnet contacts the first ferromagnetic member when the actuator is in the first position and contacts the second ferromagnetic member when the actuator is in the second position.

In some embodiments, the actuator and holder may be formed from polymeric material and may be a single unitary body formed, for example, via injection molding.

In some embodiments, the holder includes first and second portions that are releasably secured together. The first and second portions can be separated from each other to allow placement of the magnet within the holder prior to installation of the actuator within a power tool.

According to some embodiments of the present invention, a printed circuit board is secured to the housing and positioned adjacent the actuator. The hall sensor is electrically connected to a circuit on the printed circuit board and is positioned on the circuit board so as to be proximate the magnet as the actuator is moved between the first and second positions. In some embodiments, the printed circuit board includes opposite first and second sides. The actuator is in adjacent spaced-apart relationship with the printed circuit board first side, and the hall sensor is located on the printed circuit board second side. However, in other embodiments of the present invention, the hall sensor may be located on the printed circuit board first side, or even within the printed circuit board.

In some embodiments, the actuator is an elongated member having opposing, longitudinally spaced apart end portions. Each of the end portions has a tapered configuration such that the first end portion is substantially flush with the housing first section when the actuator is in the first position and the second end portion is substantially flush with the housing second section when the actuator is in the second position.

Embodiments of the present invention are advantageous in that a single magnet can be used to change the drive direction of a power tool and to lock the forward/reverse switch actuator into position.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

DETAILED DESCRIPTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "cordless" power tool refers to power tools that do not require plug-in, hard wired electrical connections to an external power source to operate. Rather, cordless power tools have electric motors that are powered by on-board batteries, such as rechargeable batteries. A range of batteries may fit a range of cordless tools. Different cordless power tools may have a variety of electrical current demand profiles that operate more efficiently with batteries providing a suitable range of voltages and current capacities. The different cordless (e.g., battery powered) power tools can include, for example, drills, screwdrivers, ratchets, nutrunners, impacts and the like.

Embodiments of the invention may be particularly suitable for precision power tools that can be used for applications where more exact control of the applied output is desired.

Figure 1:
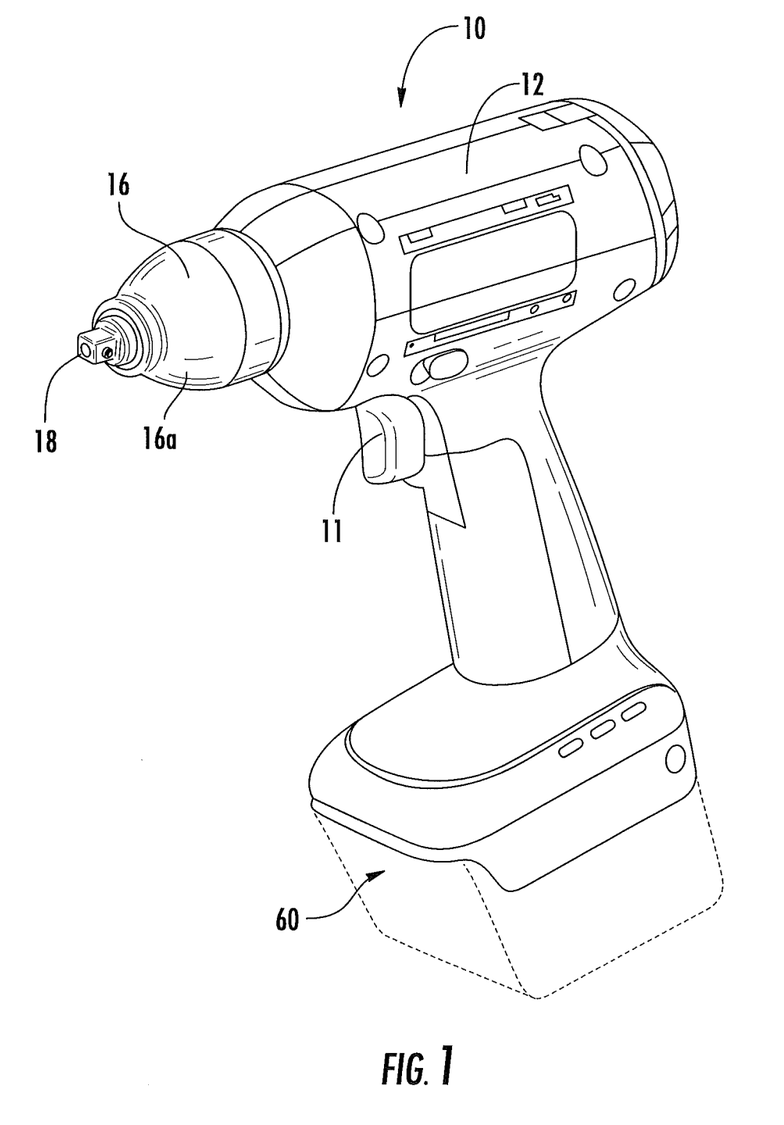
FIG. 1 is a side perspective view of an exemplary cordless power tool, according to some embodiments of the present invention.
Figure 2:
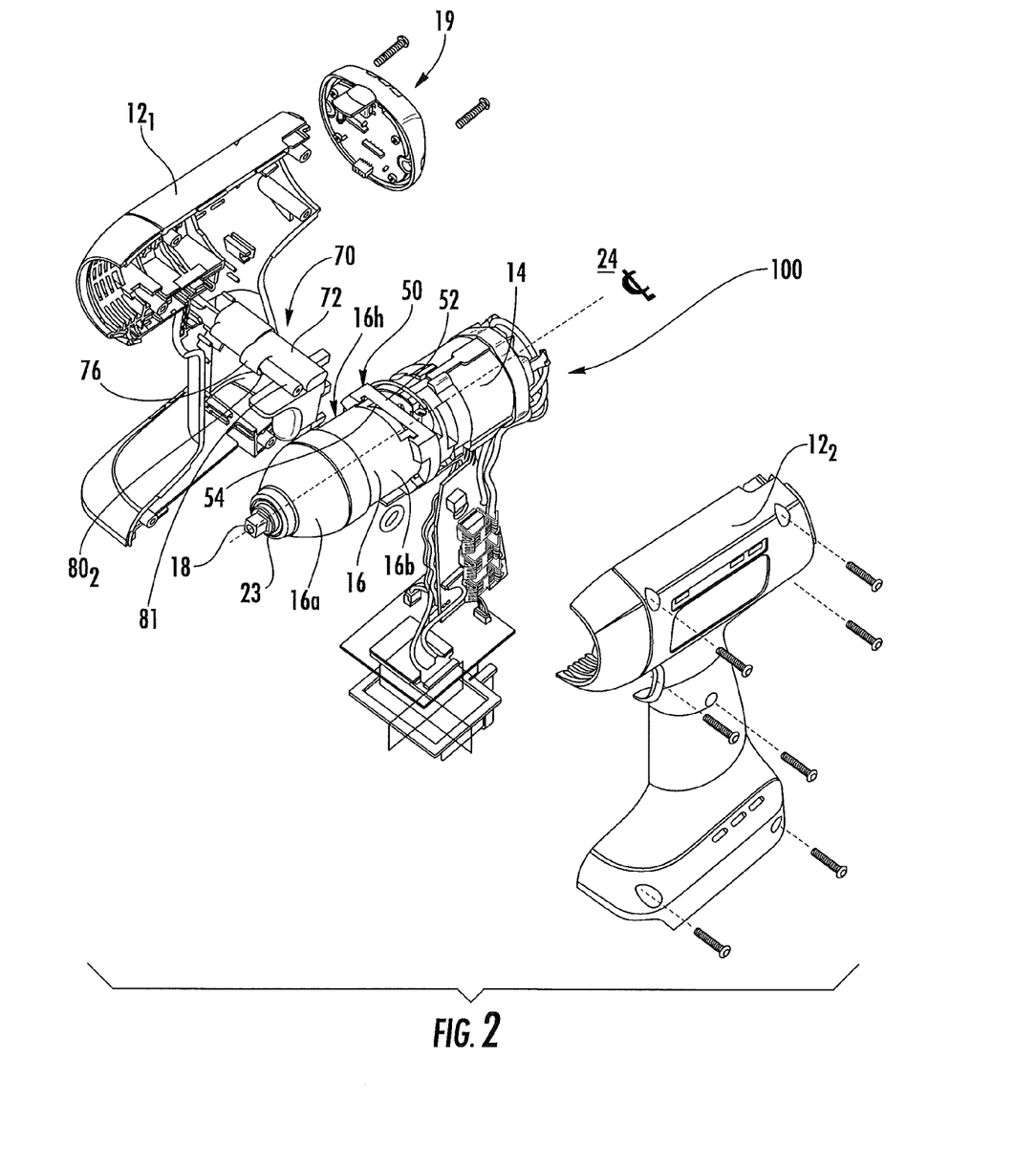
FIG. 2 is an exploded view of the tool shown in FIG. 1.

FIGS. 1 and 2 illustrate a power tool 10, according to some embodiments of the present invention. The power tool 10 includes a housing 12, a motor 14, a gearcase 16 and a tool output shaft 18. The housing 12 encases the motor 14 and partially surrounds the gearcase 16. The lower portion of the housing 12 can releasably engage a battery 60 (shown in broken line in FIG. 1). The housing 12 can include an external control such as a trigger 11 and a UI (user interface) 19 with a display. The housing 12 can include a forward/reverse switching device 70 for reversing direction of current through the motor 14 to reverse direction of rotation of the motor and the output shaft 18. As shown, the housing 12 may be provided as two matable sections $12_1$, $12_2$. In some embodiments, the matable housing sections $12_1$, $12_2$ are substantially symmetrical.

The motor 14 can be held in a desired fixed position and orientation in the housing 12 using a motor mount 50. As illustrated in FIG. 2, the motor mount 50 has opposite first and second sides 52, 54. The motor 14 is attached to the motor mount first side 52, and the gearcase 16 is attached to the motor mount second side 54. The gearcase has an elongated housing 16h with opposite, longitudinally spaced apart distal and proximal end portions 16a, 16b. The gearcase housing 16h is configured to encase a drivetrain (not shown) of the power tool. The proximal end portion 16b has an opening 21 configured to receive a rotor from the motor 14 of the power tool 10 that couples with the drive train. The distal end portion 16a has an opening 23 through which an output shaft 18 of the power tool 10 extends. The gearcase housing 16h is rigidly mounted to the motor mount second side 54 creating a single unified drive train.

Figure 3:
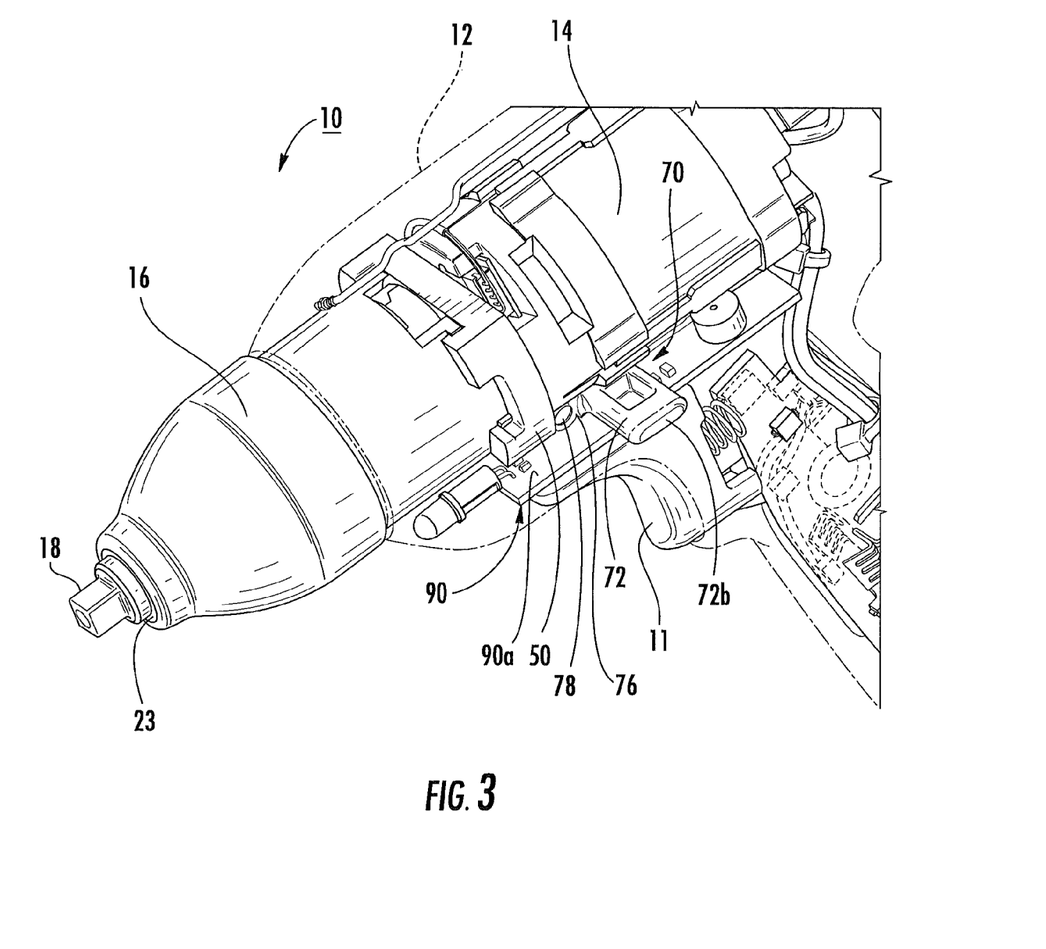
FIG. 3 is a side perspective view of a portion of the tool shown in FIG. 1 with the housing transparent to illustrate the forward/reverse switching device, according to some embodiments of the present invention.

Referring now to FIGS. 3-8, the forward/reverse switching device 70 will be described in further detail. In FIG. 3, the housing 12 of the power tool 10 is shown as transparent in order to better illustrate the forward/reverse switching device 70 within the tool 10. The illustrated forward/reverse switching device 70 includes an actuator 72 that is slidably secured to the housing 12 within passageway 74 (FIG. 4A) and is configured to be movable by a user between first and second positions. When the actuator 72 is in the first position, the motor rotates the output shaft 18 in a first direction (e.g., clockwise or counter clockwise). When the actuator 72 is in the second position, the motor rotates the output shaft 18 in a second direction opposite the first direction (e.g., counter clockwise or clockwise).

Figure 5:
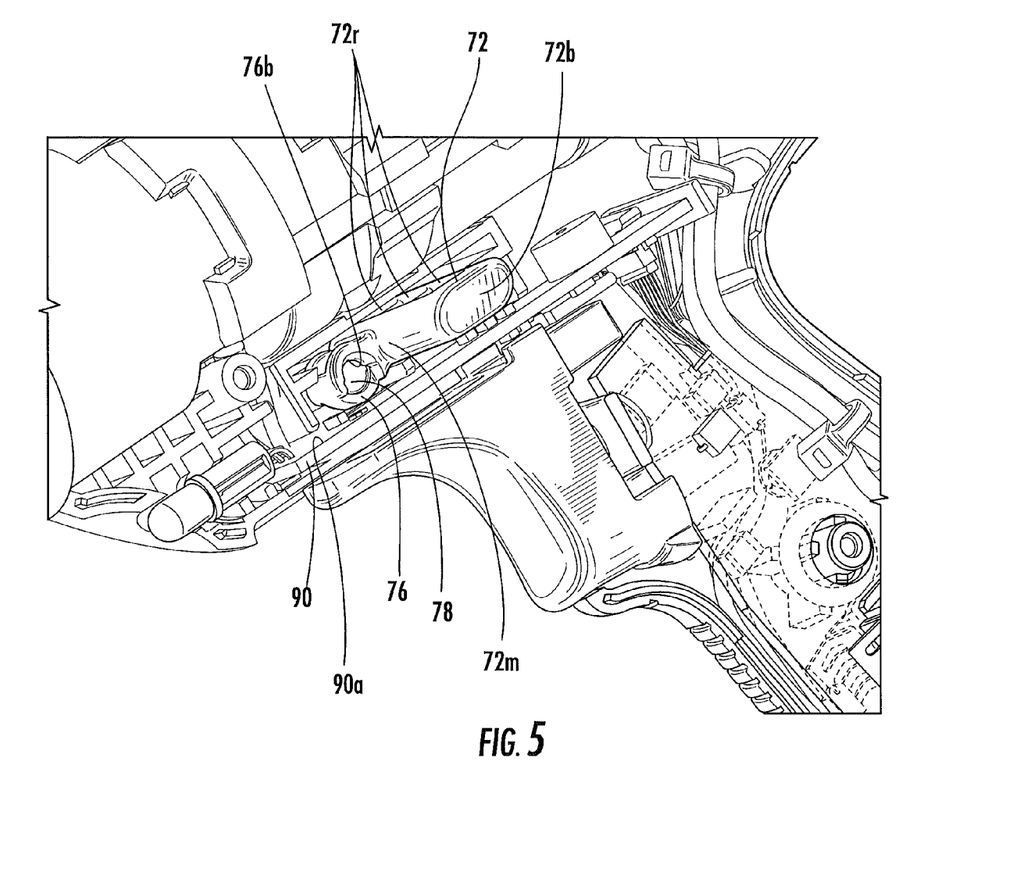
FIG. 5 illustrates the tool of FIGS. 4A-4B with the forward/reverse switching device actuator installed within the housing.
Figure 7:
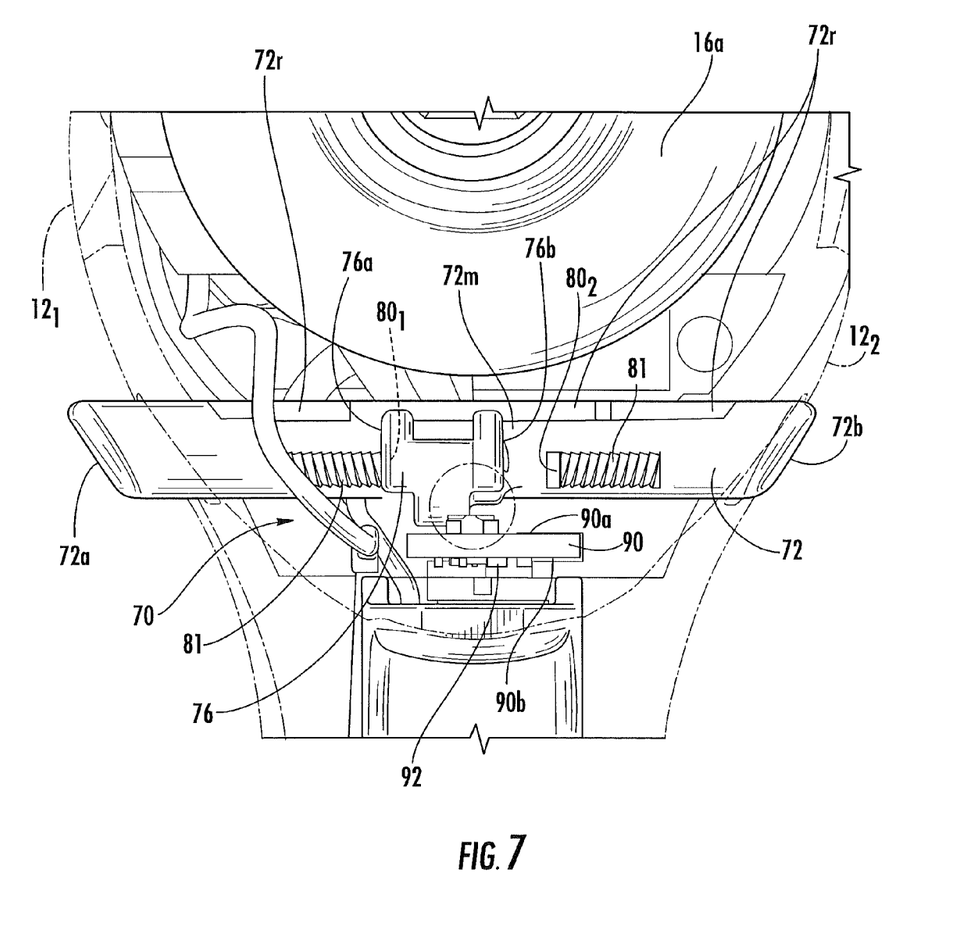
FIG. 7 is a front section view of the tool of FIG. 3 illustrating the forward/reverse switching device actuator in one of the two locked positions.
Figure 8:
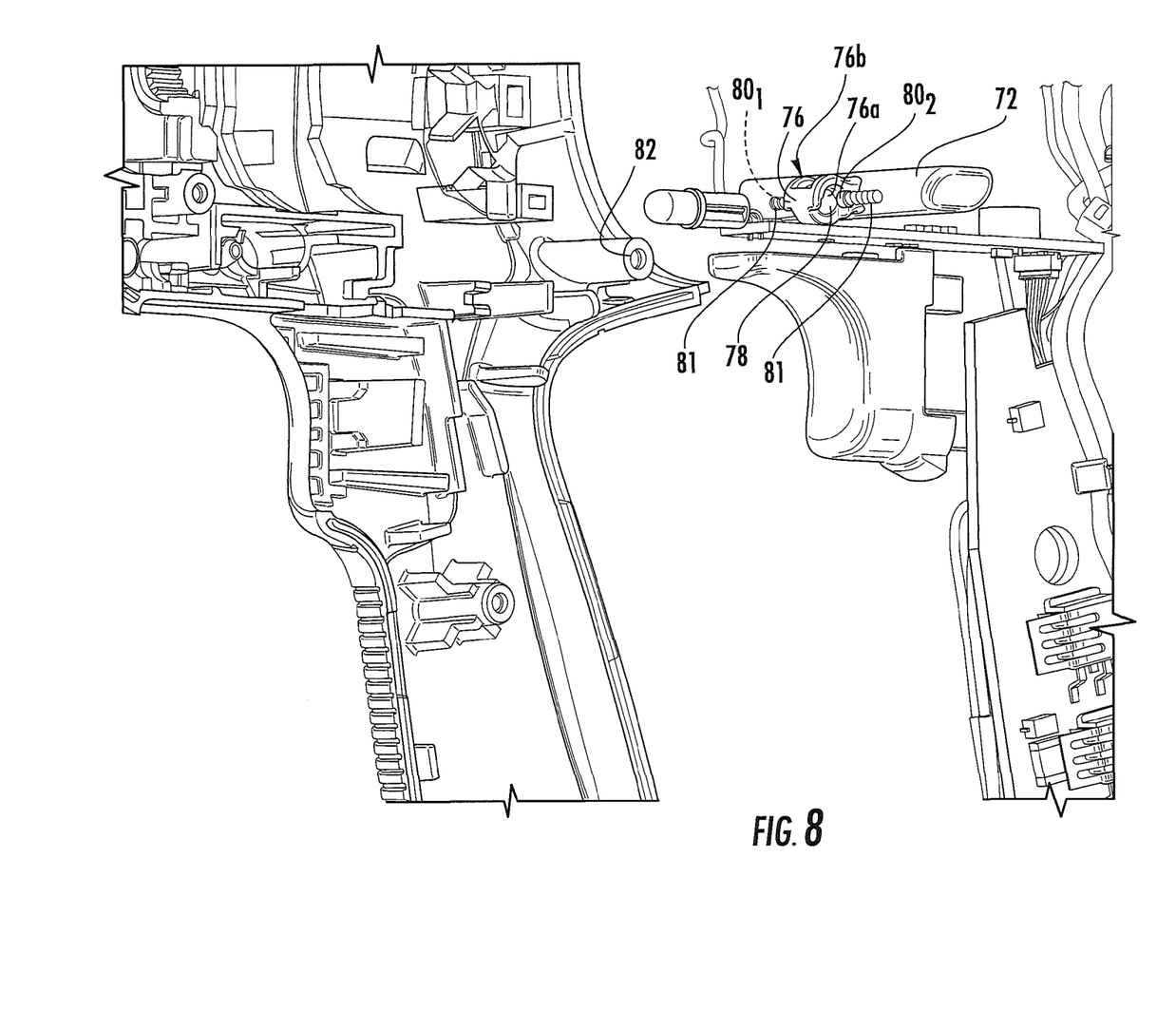
FIG. 8 is a partial front perspective view of the tool of FIG. 3 illustrating the forward/reverse switching device.

In the illustrated embodiment, the actuator 72 is an elongated member having opposing, longitudinally spaced apart end portions 72a, 72b (FIG. 7). In some embodiments, a plurality of spaced-apart recesses 72r are formed in the actuator 72 to provide structural rigidity thereto, as illustrated in FIG. 5. However, in other embodiments of the present invention, the actuator 72 may be sufficiently rigid without the use of recesses 72r. Each of the end portions 72a, 72b has a tapered configuration such that the first end portion 72a is substantially flush with the housing first section $12_1$ when the actuator 72 is in the first position and the second end portion 72b is substantially flush with the housing second section $12_2$ when the actuator is in the second position. In FIG. 7, the actuator 72 is in the second position such that the second end portion 72b is substantially flush with the housing second section $12_2$. The term "substantially flush", as used herein, means that the end portions 72a, 72b of the actuator 72 generally follow the contour of respective housing sections $12_1$, $12_2$ and do not extend substantially outward from the respective housing sections $12_1$, $12_2$. However, in some embodiments of the present invention, the end portions 72a, 72b of the actuator 72 may not have a tapered configuration and may not be substantially flush with the respective housing sections $12_1$, $12_2$ when in the actuator 72 is in the first and second positions.

A magnet holder 76 extends outwardly from the actuator 72 between the actuator end portions 72a, 72b. As illustrated in FIG. 7, the magnet holder 76 is located at a medial location 72m between the end portions 72a, 72b. The magnet holder 76 retains a magnet 78 therein. In the illustrated embodiment, the magnet 78 has a cylindrical configuration and the magnet holder 76 has a corresponding cylindrical cavity. The illustrated magnet holder 76 has open end portions 76a, 76b such that the magnet 78 is externally accessible. As will be described below, a first ferromagnetic member $80_1$ contacts the magnet 78 through open end portion 76a when the actuator 72 is in the first position, and a second ferromagnetic member $80_2$ when the actuator is in the second position.

Figure 4A:
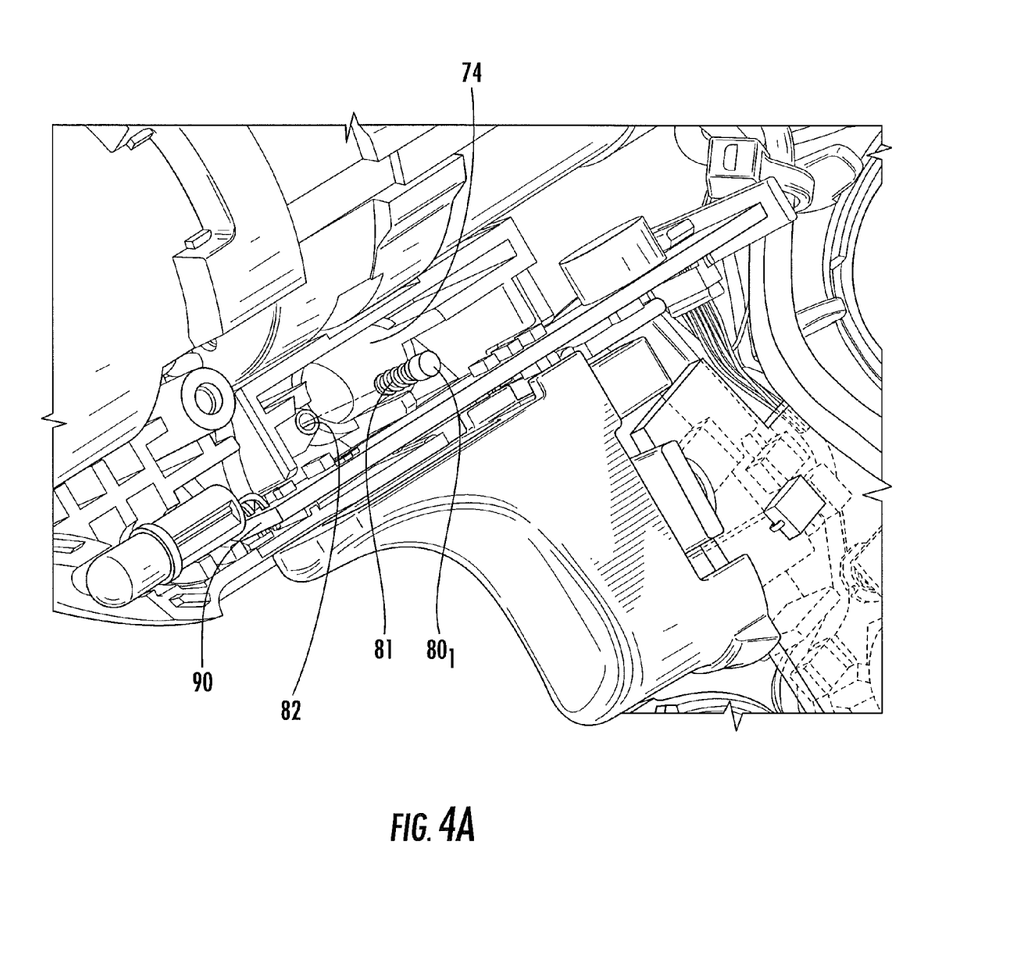
FIG. 4A is an enlarged partial front perspective view of the tool shown in FIG. 3, with a part of the housing omitted, with the forward/reverse switching device actuator omitted, and illustrating one of the ferromagnetic members and the location in the tool housing where the ferromagnetic member is secured, according to some embodiments of the present invention.
Figure 4B:
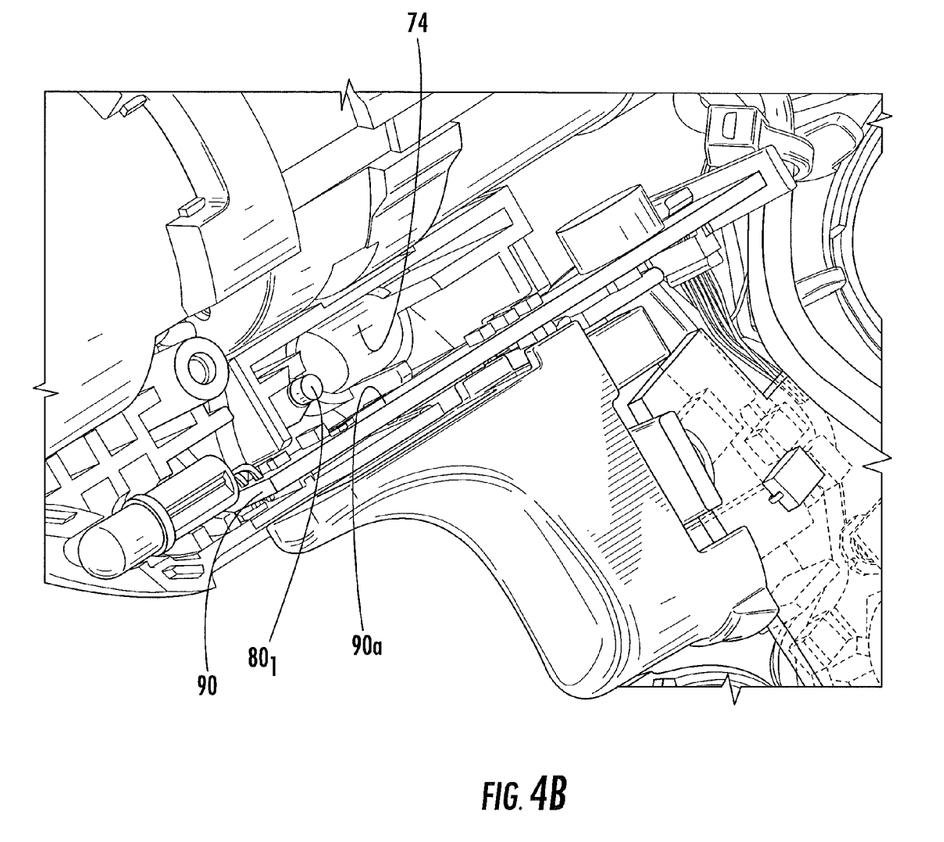
FIG. 4B illustrates the ferromagnetic member of FIG. 4A secured within the housing.

Each housing section $12_1$, $12_2$ has a respective ferromagnetic member $80_1$, $80_2$ secured thereto. For example, as shown in FIG. 4A, a first ferromagnetic member $80_1$ is secured within passageway 82 in the housing first section $12_1$. A second ferromagnetic member $80_2$ (FIGS. 2, 8) is secured within a corresponding passageway in the housing second section $12_2$. Each ferromagnetic member $80_1$, $80_2$ includes material that exhibits ferromagnetism (i.e., is magnetically attracted to a magnet). Ferromagnetic materials that may be utilized in accordance with embodiments of the present invention include elemental metals as well as alloys, oxides and other chemical compounds. Exemplary ferromagnetic materials include, but are not limited to, iron, nickel, cobalt, gadolinium, dysprosium and alloys such as steel.

In the illustrated embodiment, each ferromagnetic member $80_1$, $80_2$ is secured to a respective housing section $12_1$, $12_2$ via a threaded member 81 attached thereto. Each passageway 82 is threaded and configured to threadingly receive a threaded member 81 attached to a respective ferromagnetic member $80_1$, $80_2$. Each ferromagnetic member $80_1$, $80_2$ may be secured with a respective housing section $12_1$, $12_2$ in various other ways. Embodiments of the present invention are not limited to the illustrated configuration of ferromagnetic members $80_1$, $80_2$.

Each ferromagnetic member $80_1$, $80_2$ is positioned so as to be within range of attraction force of the magnet 78 when the actuator 72 is moved in a direction towards a respective ferromagnetic member $80_1$, $80_2$. For example, a first ferromagnetic member $80_1$ is attached to the housing first section $12_1$ so as to be within range of attraction of the magnet 88 when the actuator 72 is in the first position (FIG. 7). The actuator 72 is releasably maintained in the first position by magnetic attraction force of the magnet 78 and first ferromagnetic member $80_1$. Similarly, the second ferromagnetic member $80_2$ is attached to the second housing section $12_2$ so as to be within range of attraction of the magnet 78 when the actuator 72 is in the second position. The actuator 72 is releasably maintained in the second position by magnetic attraction force of the magnet 78 and the second ferromagnetic member $80_2$.

In the illustrated embodiment, the magnet 78 has a cylindrical configuration and the magnet holder 78 has a corresponding cylindrical configuration that receives and retains the magnet 78 therein. In the illustrated embodiment, the magnet holder 76 has open end portions 76a, 76b. This configuration allows the magnet 78 to directly contact the first ferromagnetic member $80_1$ when the actuator 72 is in the first position (FIG. 7) and allows the magnet 78 to directly contact the second ferromagnetic member $80_2$ when the actuator 72 is in the second position.

Embodiments of the present invention are not limited to the illustrated configuration of the actuator 72, magnet holder 76 and magnet 78. Each of these components may have different shapes and configurations. Moreover, direct contact between the magnet and the first and second ferromagnetic members $80_1$, $80_2$ is not required. The magnet 78 may be configured to be sufficiently close to a respective ferromagnetic member $80_1$, $80_2$ without making contact such that the actuator 72 is releasably locked in the respective first and second positions.

The actuator 72 and holder 76 may comprise various types of polymeric materials. In some embodiments, each may be a single unitary body formed, for example, via injection molding. In some embodiments, the actuator 72 and holder 76 may be a single unitary body formed, for example, via injection molding. The holder 76 may include first and second portions that are releasably secured together and that can be separated from each other to allow placement of the magnet 78 within the holder 76 prior to installation of the actuator 72 within a tool 10. In other embodiments, a open end cap may be press fit or threaded onto the body of the holder 76 to retain the magnet 78.

Figure 6:
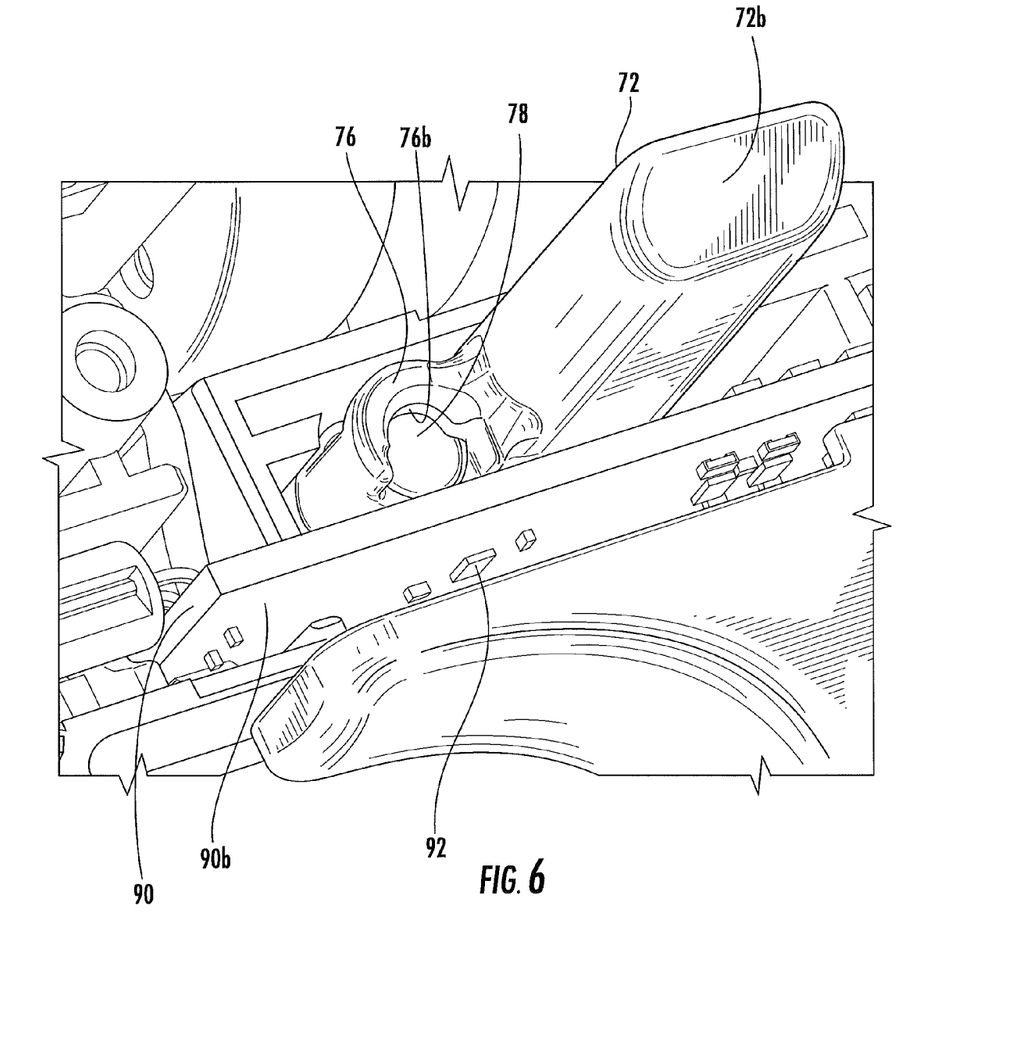
FIG. 6 is an enlarged partial bottom perspective of the tool of FIG. 5 illustrating the location of a hall sensor for reversing the polarity of the motor of the tool, according to some embodiments of the present invention.

Referring to FIG. 6, a printed circuit board 90 is secured to the housing 12 and is positioned adjacent the actuator 72. The printed circuit board 90 includes opposite first and second sides 90a, 90b. The actuator 72 is in adjacent spaced-apart relationship with the printed circuit board first side 90a. Each side 90a, 90b of the printed circuit board 90 may include various electronic components utilized in operation of the tool 10. A hall sensor 92 is attached to the printed circuit board second side 90b and is located relative to the actuator 72 so as to be proximate the magnet 78 as the actuator 72 is moved between the first and second positions. The hall sensor 92 is a transducer that varies its output voltage in response to changes in magnetic field. When the magnet 78 and hall sensor 92 are in proximity (i.e., when the magnet 78 passes over the hall sensor 92) the hall sensor 92 changes its output voltage which causes the direction of rotation of the motor 14 to reverse.

Thus, the magnet 78 of the switching device 70 serves two functions. The magnet 78 releasably secures the actuator 72 in the first and second positions, corresponding to forward and reverse rotation of the motor, and the magnet 78 cooperates with the hall sensor 92 and causes a change in direction of the motor 14 as the magnet passes over the hall sensor 92.

Embodiments of the present invention are not limited to the illustrated printed circuit board 90 and the location of hall sensor 92. The hall sensor 92 may be located on the first side 90a of the printed circuit board 90, or even within or partially within the printed circuit board 90, for example. In addition, more than one hall sensor 92 may be used.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A power tool, comprising:
    a housing comprising first and second housing sections releasably engaged;
    an electric motor mounted in the housing; and
    a switching device mounted to the housing for reversing direction of current through the motor to reverse direction of rotation thereof, the switching device comprising:
        an actuator slidably secured to the housing and configured to be movable by a user between first and second positions;
        a magnet attached to the actuator;
        a first ferromagnetic member attached to the first housing section so as to be within range of attraction force of the magnet when the actuator is in the first position, wherein the actuator is releasably maintained in the first position by magnetic attraction of the magnet and first ferromagnetic member;
        a second ferromagnetic member attached to the second housing section so as to be within range of attraction force of the magnet when the actuator is in the second position, wherein the actuator is releasably maintained in the second position by magnetic attraction of the magnet and second ferromagnetic member; and
        a hall sensor attached to the housing so as to be proximate the magnet as the actuator is moved between the first and second positions, wherein proximity of the magnet and hall sensor causes the direction of rotation of the motor to reverse.

2. The power tool of claim 1, wherein the actuator is an elongated member, and wherein the magnet is attached to a medial portion of the actuator.

3. The power tool of claim 1, wherein the actuator comprises a holder that retains the magnet.

4. The power tool of claim 3, wherein the magnet has a cylindrical configuration, and wherein the holder comprises a cavity with a corresponding cylindrical configuration that receives the magnet therein.

5. The power tool of claim 3, wherein the holder comprises open end portions such that the magnet contacts the first ferromagnetic member when the actuator is in the first position and contacts the second ferromagnetic member when the actuator is in the second position.

6. The power tool of claim 3, wherein the actuator and holder comprise polymeric material.

7. The power tool of claim 6, wherein the actuator and holder comprise a monolithic molded body.

8. The power tool of claim 3, wherein the holder comprises first and second portions that are secured together, wherein unassembled, the first and second sections allow placement of the magnet within the holder.

9. The power tool of claim 1, wherein a printed circuit board is secured to the housing and positioned adjacent the actuator, wherein the hall sensor is electrically connected to a circuit on the printed circuit board.

10. The power tool of claim 9, wherein the printed circuit board comprises opposite first and second sides, wherein the actuator is in adjacent spaced-apart relationship with the printed circuit board first side, and wherein the hall sensor is located on the printed circuit board second side.

11. The power tool of claim 1, wherein the actuator is an elongated member having opposing, longitudinally spaced apart end portions, wherein each of the end portions has a tapered configuration such that the first end portion is substantially flush with the housing first section when the actuator is in the first position and the second end portion is substantially flush with the housing second section when the actuator is in the second position.

12. The power tool of claim 1, wherein the first and second housing sections are substantially symmetrical.

13. The power tool of claim 1, wherein the power tool is a cordless power tool.

14. A switching device for reversing direction of current through an electric motor of a power tool, wherein the power tool includes a housing having first and second housing sections releasably engaged and surrounding the motor, the switching device comprising:

an elongated actuator having opposing, longitudinally spaced apart end portions;

a holder extending substantially orthogonally from a longitudinal axis of the actuator between the end portions; and a magnet secured within the holder.

15. The switching device of claim 12, wherein the holder extends from the actuator at a medial location between the end portions.

16. The switching device of claim 12, wherein the magnet has a cylindrical configuration, wherein the holder comprises a cavity with a corresponding cylindrical configuration that receives the magnet therein, and wherein the holder comprises open end portions such that the magnet is exposed at the end portions.

17. The switching device of claim 12, wherein the actuator and holder comprise polymeric material.

18. The switching device of claim 16, wherein the holder comprises first and second portions that are secured together, wherein unassembled, the first and second sections allow placement of the magnet within the holder.

19. A switching device housing for reversing direction of current through an electric motor of a power tool, the switching device housing comprising:

an elongated actuator having opposing, longitudinally spaced apart end portions; and a magnet holder extending outwardly from the actuator between the end portions, the magnet holder defining a cylindrical cavity having an axis oriented substantially in parallel with a longitudinal axis of the actuator.

20. The switching device housing of claim 19, further comprising a magnet configured in the cavity.

\* \* \* \* \*